United States Patent Office 2,748,164
Patented May 29, 1956

2,748,164

SULFONYLACETAMIDES

Raymond M. Dodson, Park Ridge, Ill., assignor, by mesne assignments, to G. D. Searle & Co., Skokie, Ill., a corporation of Delaware No Drawing. Application July 2, 1954,
Serial No. 441,161

11 Claims. (Cl. 260—558)

This invention relates to derivatives of α-phenyl-α-sulfonylacetamides, and to processes for the preparation thereof. In particular, this invention relates to compounds of the formula

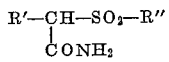

wherein R' is a phenyl or halophenyl radical, and R" is a monovalent hydrocarbon radical containing not more than 7 carbon atoms. Included among the hydrocarbon radicals comprehended by R" in the foregoing formula are methyl, ethyl, cyclopentyl, cyclohexyl, phenyl, benzyl, and tolyl radicals.

The compounds of this invention are useful in medicine for the treatment of disease and the relief of conditions inimical to the well-being of the animal body. For example, the claimed compounds are diuretics. They have the property of augmenting both urine volume and sodium excretion, producing a significant loss of body weight and decreased dyspnea in cases of edema associated with congestive cardiac failure, renal disease, cirrhosis of the liver, and other common pathologic states.

The compounds which comprise this invention are relatively insoluble in water, but may be dissolved in alcohols and certain other water-miscible organic solvents. The subject compounds may be administered in solid form as tablets or capsules; dissolved or suspended in aqueous media, they may be given parenterally.

The α-phenylsulfonyl compounds to which this invention relates are prepared by means of the following procedure: Benzaldehyde or a halobenzaldehyde such as 2,4-dichlorobenzaldehyde is reacted with benzenesulfonyl chloride and an alkali metal cyanide such as sodium cyanide—preferably at reduced temperatures of the order of 0–5° C. using an aqueous medium—to produce the corresponding α-cyanobenzyl benzenesulfonate. The benzenesulfonate is converted to the α-phenylsulfonylacetonitrile by interaction in a polar solvent—for example, a ketonic solvent such as acetone—with thiourea and an additional quantity of benzenesulfonyl chloride. Finally, the nitrile is hydrated to give the α-phenylsulfonylacetamide, using concentrated sulfuric acid or some such recognizedly selective hydrolytic agent.

The α-alkylsulfonyl-, α-cycloalkylsulfonyl-, α-benzylsulfonyl-, and α-tolylsulfonyl nitriles of this invention may also be obtained by the foregoing procedure, provided alkanesulfonyl chloride, cycloalkanesulfonyl chloride, α-toluenesulfonyl chloride, and o-, m-, or p-toluenesulfonyl chloride, respectively, are substituted for benzenesulfonyl chloride in the reaction with a benzaldehyde and an alkali metal cyanide, and again in the reaction with sulfonate and thiourea. A preferred embodiment of the present invention, however, contemplates the preparation of these compounds simply by replacing with a sulfonyl chloride of choice, the benzenesulfonyl chloride used together with thiourea to convert a benzenesulfonate to an α-phenylsulfonylacetonitrile, as outlined above. In accordance with this procedure, an appropriate α-cyanobenzyl benzenesulfonate is reacted at ordinary temperatures with a selected alkanesulfonyl, cycloalkanesulfonyl, or toluenesulfonyl chloride in the presence of thiourea, using acetone or the equivalent as a solvent, to produce the desired intermediate which, when hydrolyzed as previously described yields the corresponding α-alkylsulfonyl-, α-cycloalkysulfonyl-, α-benzylsulfonyl-, and α-tolylsulfonylacetamides of this invention.

The following examples will illustrate in detail certain of the compounds which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

Example 1

A. *α-Phenyl-α-phenylsulfonylacetonitrile.*—A mixture of 106 parts of benzaldehyde, 176 parts of benzenesulfonyl chloride, 49 parts of sodium cyanide, and 200 parts of water is maintained with stirring at 0–5° C. for 2½ hours. The precipitate which forms is recovered on a filter, washed thereon with water, and then dissolved in 560 parts of acetone. To this solution is added, at 0–5° C. with agitation, 176 parts of benzenesulfonyl chloride, followed portion-wise by 152 parts of thiourea. The slurry which forms is continuously agitated at room temperature for 1 hour, then treated with 400 parts of ethyl alcohol and 500 parts of water. The mixture is heated to 90° C., cooled, and filtered, in that order. The precipitate thus recovered is washed by suspension in water, then isolated by filtration, and finally taken up in dilute aqueous potash. A small amount of insoluble material is filtered out, and the filtrate is thereupon made acid with glacial acetic acid. The product which precipitates, crystallized from dilute aqueous acetone, is α-phenyl-α-phenylsulfonylacetonitrile, M. P. 148–150° C.

B. *α-Phenyl-α-phenylsulfonylacetamide.*—To a mixture of 55 parts of concentrated sulfuric acid and 3 parts of water is slowly added 15 parts of α-phenyl-α-phenylsulfonylacetonitrile prepared as detailed in the foregoing Part A of this example. When solution is complete, the reactants are heated at 90–100° C. for approximately 10 minutes. The reaction mixture is then quenched on ice, diluted with water, and filtered, in that order. The insoluble product thus isolated, crystallized from an aqueous mixture of methyl ethyl ketone and alcohol, shows M. P. 268–269.5° C. It has the formula

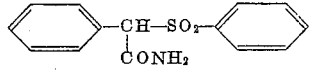

Example 2

A. *α-Cyanobenzyl benzenesulfonate.*—A mixture of 53 parts of benzaldehyde, 88 parts of benzenesulfonyl chloride, 25 parts of sodium cyanide, and 100 parts of water is allowed to stand for 3 hours at 0–5° C. with occasional agitation. The cream-colored solid precipitated in process is filtered out and then dissolved in a cold mixture of 80 parts of acetone, 80 parts of ethyl alcohol, and 35 parts of ether. A small amount of material remains undissolved and is discarded. Addition of 150 parts of ice precipitates α-cyanobenzyl benzenesulfonate as an oil which granulates on standing. Crystallized from ethyl alcohol, it shows M. P. 60–61° C.

B. *α-Ethylsulfonyl-α-phenylacetonitrile.*—To a solution of 27 parts of α-cyanobenzyl benzenesulfonate—prepared as detailed in the foregoing Part A of this example—and 13 parts of ethanesulfonyl chloride in 40 parts of acetone is added, portion-wise with agitation over a 30-minute period, 15 parts of thiourea. The mixture is allowed to stand at room temperature for 30 minutes, whereupon 40 parts of alcohol is added, followed by sufficient water to dissolve the precipitate which has formed and bring the solution to the point of cloudiness again. The reactants are allowed to stand overnight, then diluted with water, and finally extracted with ether. The ether solution is washed with water, filtered free of a small amount of insoluble material, and finally extracted with dilute aqueous potash, in that order. The alkaline extract is acidified with muriatic acid, causing precipitation of the product which, recovered on a filter and then crystallized from dilute aqueous methyl alcohol, shows M. P. approximately 79–80° C. The product is α-ethylsulfonyl-α-phenylacetonitrile.

C. *α-Ethylsulfonyl-α-phenylacetamide.* — Using the technique of Example 1B, 10 parts of α-ethylsulfonyl-α-phenylacetonitrile is hydrolyzed with 55 parts of concentrated sulfuric acid and 3 parts of water to give α-ethylsulfonyl-α-phenylacetamide, having the formula

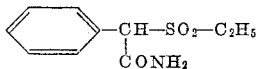

*Example 3*

A. *α-Cyclohexylsulfonyl - α - phenylacetonitrile.*—To a mixture of 39 parts of α-cyanobenzyl benzenesulfonate—prepared as detailed in Example 2A—and 26 parts of cyclohexanesulfonyl chloride—prepared by interaction of cyclohexane and sulfuryl chloride at reflux temperatures in the presence of pyridine—in 55 parts of acetone is added, portion-wise with agitation over a 30-minute period, 27 parts of thiourea. The reagents are allowed to stand for an additional 30 minutes with continued agitation, following which 55 parts of ethyl alcohol and then sufficient water to dissolve precipitated material and bring the solution again to the point of cloudiness, are added. The reagents are allowed to stand overnight. Water is added and the resultant mixture is extracted with ether. The ether extract is washed with water, filtered free of a small amount of insoluble material, and extracted with dilute aqueous potash, in that order. A dark brown oil which separates is discarded, as is the ether phase. The alkaline extract is acidified with dilute muriatic acid, precipitating the desired α-cyclohexylsulfonyl-α-phenylacetonitrile, which is separated and used in the succeeding Part B of this example.

B. *α-Cyclohexylsulfonyl-α-phenylacetamide.*—Interaction of 9 parts of the α-cyclohexylsulfonyl-α-phenylacetonitrile of the foregoing Part A of this example, 56 parts of concentrated sulfuric acid, and 3 parts of water, according to the procedure described in Example 1B, converts the nitrile to the corresponding acetamide having the formula

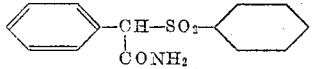

*Example 4*

A. *α-Benzylsulfonyl-α-phenylacetonitrile.*—To a solution of 27 parts of α-cyanobenzyl benzenesulfonate—prepared as detailed in Example 2A above—and 27 parts of α-toluenesulfonyl chloride in 50 parts of acetone is added, portion-wise over a 30-minute period with agitation, 15 parts of thiourea. Agitation is continued for a further 2-hour period, following which the cream-colored solid which precipitates in process is removed by filtration. The precipitate is extracted with 100 parts of acetone, and this acetone extract is combined with the acetone filtrate above. The combined acetone solutions are then concentrated to one-half their original volume. Sufficient water is next added to the boiling concentrate to cause slight turbidity. Upon cooling, a light-yellow-colored solid is precipitated which, washed by trituration with alcohol and then recrystallized from benzene, shows M. P. approximately 166–166.5° C. The product is α-benzylsulfonyl-α-phenylacetonitrile.

B. *α-Benzylsulfonyl-α-phenylacetamide.*—By the technique of Example 1B above, 12 parts of α-benzylsulfonyl-α-phenylacetonitrile is hydrolyzed with 55 parts of concentrated sulfuric acid and 3 parts of water to give α-benzylsulfonyl-α-phenylacetamide having the formula

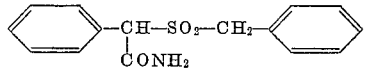

*Example 5*

A. *α-Cyano-p-chlorobenzyl benzenesulfonate.*—A mixture of 70 parts of p-chlorobenzaldehyde, 88 parts of benzenesulfonyl chloride, 25 parts of sodium cyanide, and 100 parts of water is allowed to stand for 3 hours at 0–5° C. with occasional agitation. Cooling is then discontinued and the reaction mixture let stand for 1 hour at room temperature with continued occasional agitation. The aqueous layer is separated and discarded. The oily residue is purified by dissolution in a mixture of acetone, alcohol, and ether; filtration of this solution; and precipitation of the filtrate with 150 parts of ice. The oil which separates is α-cyano-p-chlorobenzyl benzene-sulfonate.

B. *α-(p-Chlorophenyl)-α-methylsulfonylacetonitrile.*—To a solution of 62 parts of the benzenesulfonate of the preceding Part A and 23 parts of methanesulfonyl chloride in 80 parts of acetone is added, portion-wise with agitation, 30 parts of thiourea. After 15 minutes, a clear solution results, whereupon agitation is discontinued and the reactants let stand for 3 hours undisturbed. Approximately 80 parts of ethyl alcohol is then added, followed by sufficient water to dissolve initially insoluble material and subsequently effect precipitation of the desired product. The reaction product is extracted with ether and the ether solution in turn extracted first with water and then with dilute aqueous potash. The alkaline extract, upon acidification precipitates a crystalline solid which, crystallized from a mixture of benzene and normal hexane and then from dilute aqueous methyl alcohol, shows M. P. approximately 116.5–117° C. This material is α-(p-chlorophenyl)-α-methylsulfonylacetonitrile.

C. *α-(p-Chlorophenyl)-α-methylsulfonylacetamide.*—To a mixture of 33 parts of concentrated sulfuric acid and 6 parts of water is slowly added 5 parts of α-(p-chlorophenyl)-α-methylsulfonylacetonitrile. The reactants are heated at 90–100° C. for 10 minutes after the nitrile dissolves. The reaction mixture is then poured into water, precipitating insoluble α-(p-chlorophenyl)-α-methylsulfonylacetamide, which recovered on a filter and then crystallized from very dilute ethyl alcohol, shows M. P. approximately 205–206° C. The product has the formula

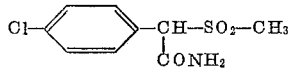

*Example 6*

A. *α-(p-Chlorophenyl)-α-phenylsulfonylacetonitrile.*—To a solution of 77 parts of the benzenesulfonate prepared according to the procedure described in Part A of the preceding Example 5, and 18 parts of benzenesulfonyl chloride in 80 parts of acetone is added, portion-wise over a half-hour period and with agitation, 15 parts of thiourea. The reaction mixture is then heated at 90° C. for 10 minutes, after which it is diluted with water. The materials are extracted with ether and the ether solution, in turn, extracted first with water and then with dilute aqueous potash. The alkaline extract, upon acidification, precipitates a crystalline solid which, crystallized from dilute aqueous acetone and then from methyl alcohol, shows M. P. 139.5–141° C. This material is α-(p-chlorophenyl) α-phenylsulfonylacetronitrile.

B. α - (p-Chlorophenyl)-α-phenylsulfonylacetamide.—The acetonitrile of the preceding Part A of this example is converted to the corresponding acetamide by heating 4 parts of the nitrile with 33 parts of concentrated sulfuric acid and 2 parts of water until the reagents are in solution. The reaction mixture is then poured into water, precipitating the desired amide which—separated by filtration, washed on the filter with a mixture of ethyl alcohol and ethyl acetate, and finally recrystallized from aqueous dioxane—shows M. P. 272–273° C. The product has the formula

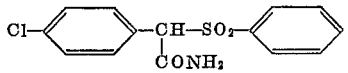

Example 7

A. α-Cyano-2,4-dichlorobenzyl benzenesulfonate.—To a mixture of 88 parts of 2,4-dichlorobenzaldehyde and 88 parts of benzenesulfonyl chloride is added a solution of 25 parts of sodium cyanide in 75 parts of water. The reagents are maintained at 0–5° C. for 3 hours with agitation, whereupon the aqueous supernatant is decanted from the oily residue. This residue is washed well with water and then crystallized from a mixture of acetone, ethyl alcohol, and ether. Two additional crystallizations, using the same solvents as before, afford pure α-cyano-2,4-dichlorobenzyl benzenesulfonate, M. P. 47.5–52° C.

B. α-(2,4 - dichlorophenyl) - α - phenylsulfonylacetonitrile.—To a solution of 106 parts of the sulfonate of the preceding Part A of this example and 53 parts of benzenesulfonyl chloride in 275 parts of acetone is added, portion-wise with agitation, 45 parts of thiourea. A mildly exothermic reaction ensues. The reactants are cooled to room temperature and maintained thereat with continued agitation for 2½ hours. Approximately 200 parts of ethyl alcohol is then added, followed by sufficient water to dissolve insoluble matter. Clarification is temporary, a dense precipitate being rapidly formed. The mixture is heated at 90° C. for 30 minutes, following which it is cooled and then extracted several times with ether. The ether extracts are combined and extracted in turn with dilute aqueous potash. Upon acidification of the alkaline extract, an oil comes down which granulates on standing. Dissolved in dilute aqueous alkali and reprecipitated with aqueous acid, this material is next twice crystallized from a mixture of acetone and ether and, finally, from acetone and water, to give pure α - (2,4 - dichlorophenyl) - α - phenylsulfonylacetonitrile, M. P. 146–147° C.

C. α - (2,4-dichlorophenyl) - α - phenylsulfonylacetamide.—Using the technique of the foregoing Example 6B, 6 parts of α-(2,4-dichlorophenyl)-α-phenylsulfonylacetonitrile is hydrolyzed with a mixture of 50 parts of concentrated sulfuric acid and 3 parts of water to give α-(2,4-dichlorophenyl)-α-phenylsulfonylacetamide, having the formula

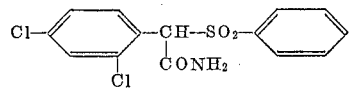

I claim:
1. A compound of the formula

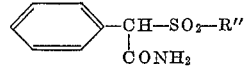

wherein R″ is a monovalent aromatic hydrocarbon radical containing less than 8 carbon atoms.

2. α-Phenyl-α-phenylsulfonylacetamide.
3. A compound of the formula

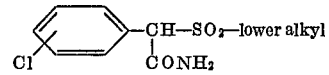

wherein the lower alkyl radicals specified contain less than 6 carbon atoms.

4. α-(p-Chlorophenyl)-α-methylsulfonylacetamide.
5. α-(p-Chlorophenyl)-α-phenylsulfonylacetamide.
6. A compound of the formula

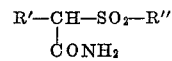

wherein R′ is selected from the group consisting of phenyl radicals and phenyl radicals substituted by chlorine; and R″ is selected from the group consisting of monovalent aromatic hydrocarbon radicals containing less than 8 carbon atoms, lower alkyl radicals, and cyclohexyl radicals.

7. A compound of the formula

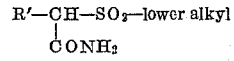

wherein R′ is a phenyl radical substituted by chlorine.
8. A compound of the formula

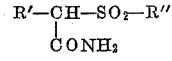

wherein R′ is a phenyl radical substituted by chlorine, and R″ is a monovalent aromatic hydrocarbon radical containing less than 8 carbon atoms.

9. α-Benzylsulfonyl-α-phenylacetamide.
10. A compound of the formula

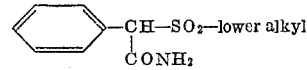

11. α-Ethylsulfonyl-α-phenylacetamide.

References Cited in the file of this patent

Fuchs: "Monatshefte fur Chemie," vol. 53/54 (1929), page 441.